United States Patent
Umezawa

(10) Patent No.: US 7,495,802 B2
(45) Date of Patent: Feb. 24, 2009

(54) IMAGE PROCESSING APPARATUS, IMAGE PROCESSING METHOD AND IMAGE PROCESSING PROGRAM

(75) Inventor: Hiroki Umezawa, Izunokuni (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 201 days.

(21) Appl. No.: 11/455,118

(22) Filed: Jun. 16, 2006

(65) Prior Publication Data

US 2007/0297667 A1 Dec. 27, 2007

(51) Int. Cl.
H04N 1/60 (2006.01)
G06K 1/00 (2006.01)
G06F 15/00 (2006.01)

(52) U.S. Cl. ........................................ 358/1.9; 358/518

(58) Field of Classification Search ......... 358/1.9–3.32, 358/500–540
See application file for complete search history.

(56) References Cited

U.S. PATENT DOCUMENTS

| 2002/0126302 | A1* | 9/2002 | Fukao | 358/1.9 |
| 2005/0206927 | A1* | 9/2005 | Yamada | 358/1.9 |
| 2007/0285679 | A1 | 12/2007 | Umezawa | |

FOREIGN PATENT DOCUMENTS

JP 2002-259109 9/2002

JP 2003-296088 10/2003

OTHER PUBLICATIONS

Gretag-Macbeth, ProfileMaker, Professional Manual, p. 157, Profile Editor.

* cited by examiner

Primary Examiner—Douglas Q Tran
(74) Attorney, Agent, or Firm—Amin, Turocy & Calvin, LLP

(57) ABSTRACT

It is an object of the invention to provide a technique for preventing image quality deterioration of a print image involved in adjustment of color conversion parameters in image formation processing.

An image processing apparatus includes: a change information acquiring unit that acquires, when first brightness setting information is changed, information on the change, the first brightness setting information defining, in printing a color that can be represented by color materials of plural colors, brightness that should be represented using the color materials; a calculating unit that calculates, on the basis of the change information acquired by the change information acquiring unit, information on second brightness setting information defining, in printing a color represented only by a black color material, brightness that should be represented using the color material, the second brightness setting information making it possible to print an image of substantially the same brightness as an image printed using the first brightness setting information after the change; and a setting information changing unit that changes, on the basis of the information calculated by the calculating unit, setting content of the second brightness setting information.

14 Claims, 13 Drawing Sheets

FIG.6

| Address | | | Data | | | |
|---|---|---|---|---|---|---|
| L* | a* | b* | C | M | Y | K |
| L1 | a1 | b1 | C1 | M1 | Y1 | K1 |
| L2 | a2 | b2 | C2 | M2 | Y2 | K2 |
| L3 | a3 | b3 | C3 | M3 | Y3 | K3 |
| …… | …… | …… | …… | …… | …… | …… |
| L12 | a13 | b13 | C12 | M12 | Y12 | K12 |
| …… | …… | …… | …… | …… | …… | …… |
| L100 | a100 | b100 | C100 | M100 | Y100 | K100 |
| …… | …… | …… | …… | …… | …… | …… |
| …… | …… | …… | …… | …… | …… | …… |
| …… | …… | …… | …… | …… | …… | …… |
| L1331 | a1331 | b1331 | C1331 | M1331 | Y1331 | K1331 |

FIG.7

| Address | | |
|---|---|---|
| L* | a* | b* |
| L1' | a1 | b1 |
| L2' | a2 | b2 |
| L3' | a3 | b3 |
| …… | …… | …… |
| L12' | a13 | b13 |
| …… | …… | …… |
| L100' | a100 | b100 |
| …… | …… | …… |
| …… | …… | …… |
| …… | …… | …… |
| L1331' | a1331 | b1331 |

FIG.8

| Address | | | Data | | | |
|---|---|---|---|---|---|---|
| L* | a* | b* | C | M | Y | K |
| L1' | a1 | b1 | C1' | M1' | Y1' | K1' |
| L2' | a2 | b2 | C2' | M2' | Y2' | K2' |
| L3' | a3 | b3 | C3' | M3' | Y3' | K3' |
| …… | …… | …… | …… | …… | …… | …… |
| L12' | a13 | b13 | C12' | M12' | Y12' | K12' |
| …… | …… | …… | …… | …… | …… | …… |
| L100' | a100 | b100 | C100' | M100' | Y100' | K100' |
| …… | …… | …… | …… | …… | …… | …… |
| …… | …… | …… | …… | …… | …… | …… |
| …… | …… | …… | …… | …… | …… | …… |
| L1331' | a1331 | b1331 | C1331' | M1331' | Y1331' | K1331' |

FIG.9

| Address | | | Data | | | |
|---|---|---|---|---|---|---|
| L* | a* | b* | C | M | Y | K |
| L1 | a1 | b1 | C1' | M1' | Y1' | K1' |
| L2 | a2 | b2 | C2' | M2' | Y2' | K2' |
| L3 | a3 | b3 | C3' | M3' | Y3' | K3' |
| …… | …… | …… | …… | …… | …… | …… |
| L12 | a13 | b13 | C12' | M12' | Y12' | K12' |
| …… | …… | …… | …… | …… | …… | …… |
| L100 | a100 | b100 | C100' | M100' | Y100' | K100' |
| …… | …… | …… | …… | …… | …… | …… |
| …… | …… | …… | …… | …… | …… | …… |
| …… | …… | …… | …… | …… | …… | …… |
| L1331 | a1331 | b1331 | C1331' | M1331' | Y1331' | K1331' |

FIG.10

| Address | | | Data | | | |
|---|---|---|---|---|---|---|
| L* | a* | b* | C | M | Y | K |
| 0 | 0 | 0 | C1" | M1" | Y1" | K1" |
| 1 | 0 | 0 | C2" | M2" | Y2" | K2" |
| 2 | 0 | 0 | C3" | M3" | Y3" | K3" |
| …… | …… | …… | …… | …… | …… | …… |
| 30 | 0 | 0 | C30" | M30" | Y30" | K30" |
| …… | …… | …… | …… | …… | …… | …… |
| 60 | 0 | 0 | C60" | M60" | Y60" | K60" |
| …… | …… | …… | …… | …… | …… | …… |
| …… | …… | …… | …… | …… | …… | …… |
| …… | …… | …… | …… | …… | …… | …… |
| 100 | 0 | 0 | C100" | M100" | Y100" | K100" |

FIG.11

| Address | Data |
|---|---|
| L* | K |
| 0 | K1 |
| 1 | K2 |
| 2 | K3 |
| …… | …… |
| 30 | K30 |
| …… | …… |
| 60 | K60 |
| …… | …… |
| …… | …… |
| …… | …… |
| 100 | K100 |

FIG.12

| Address | | | Data | | | | |
|---|---|---|---|---|---|---|---|
| L* | a* | b* | C | M | Y | K | L* |
| 0 | 0 | 0 | C1" | M1" | Y1" | K1" | L1 |
| 1 | 0 | 0 | C2" | M2" | Y2" | K2" | L2 |
| 2 | 0 | 0 | C3" | M3" | Y3" | K3" | L3 |
| ...... | ...... | ...... | ...... | ...... | ...... | ...... | ...... |
| 30 | 0 | 0 | C30" | M30" | Y30" | K30" | L30 |
| ...... | ...... | ...... | ...... | ...... | ...... | ...... | ...... |
| 60 | 0 | 0 | C60" | M60" | Y60" | K60" | L60 |
| ...... | ...... | ...... | ...... | ...... | ...... | ...... | ...... |
| ...... | ...... | ...... | ...... | ...... | ...... | ...... | ...... |
| ...... | ...... | ...... | ...... | ...... | ...... | ...... | ...... |
| 100 | 0 | 0 | C100" | M100" | Y100" | K100" | L100 |

FIG.13

| Address | Data |
|---|---|
| L* | K |
| 0 | K1' |
| 1 | K2' |
| 2 | K3' |
| ...... | ...... |
| 30 | K30' |
| ...... | ...... |
| 60 | K60' |
| ...... | ...... |
| ...... | ...... |
| ...... | ...... |
| 100 | K100' |

IMAGE PROCESSING APPARATUS, IMAGE PROCESSING METHOD AND IMAGE PROCESSING PROGRAM

BACKGROUND OF THE INVENTION

1. Field of the Invention

The present invention relates to an image processing technique, and, more particularly to a technique for performing color adjustment for images.

2. Description of the Related Art

In recent years, there has been an increasing demand for color print because of colorization of documentation application software (word processor, spread sheet, and rendering software) and spread of the same.

When the color print is performed using such application software, a document may be printed in colors undesirable for a user. In particular, when a corporate mark (a logo) or the like for which accurate colors are indispensable is printed, the mark may be printed in colors slightly deviating from desired colors.

This is caused by a design of color conversion parameters of a printer. The color conversion parameters of the printer are basically designed to print accurate colors. On the other hand, since various figures, characters, and natural images are objects of printing, the color conversion parameters are fine tuned such that, when the respective objects are printed, average users feel that colors are preferable. For example, in many cases, the color conversion parameters are fine tuned to be slightly bright or slight strong in contrast such that preferable colors are obtained. Therefore, slight deviation may occur in colors of the print of the corporate mark requiring accurate colors.

Even when the color conversion parameters are designed to print accurate colors, it is difficult to create the color conversion parameters for accurately printing all colors inputted. An error of colors partially occurs. For example, concerning the corporate mark, every company has different colors of a corporate mark. Thus, although a certain corporate mark can be printed in accurate colors, another corporate mark may be printed in colors deviating from accurate colors. Further, printers have individual differences to some extent, even if color conversion parameters set in a printer in advance are used, it is not always possible to print colors as expected from the color conversion parameters.

Users have different tastes of colors individually. Thus, for example, when a usual red character is printed, a user may feel dissatisfied with red by the color conversion parameters.

As measures for coping with such problems, there is color adjustment processing. FIG. 16 is a diagram for explaining the color adjustment processing. The color adjustment processing is, for example, processing for correcting color conversion parameters stored in a printer such that a print result of desired colors is obtained. First, a color adjustment processing unit 801 reads presently set color conversion parameters from the printer. The color conversion parameters are stored in a color conversion parameter storing unit 802 arranged in the printer. The color adjustment processing unit 801 reads color adjustment image data for correcting the color conversion parameters. This color adjustment image data is usually image data including plural different color patches prepared in advance. These color patches are treated as color data inputted to the printer. The color adjustment processing unit 801 corrects the color conversion parameters to obtain desired colors from this color data. The color conversion parameters corrected are stored in the color conversion parameter storing unit 802 in the printer again.

FIG. 17 is a diagram for explaining color conversion paths for performing color conversion processing for an input image using the color conversion parameters adjusted as described above. Conventionally, a color printer often has two color conversion paths. One of the two color conversion paths (a path 1) is used when a color signal inputted is a chromatic color. The path 1 has a role of converting color signals inputted (e.g., RGB signals) into color signals (CMYK) corresponding to a color material of the printer. The other of the two color conversion parameters (a path 2) is a path used only when a color signal inputted is a substantially achromatic color. The path 2 is a path for converting a color inputted such that the color is reproduced with only a black (K) color material of the printer.

Effects of the path 2 will be explained using FIGS. 18 and 19.

FIG. 18 is a color conversion result by the path 1 when a character of a 50% achromatic color (R=G=G=50%) is inputted. The color conversion result is, for example, C=20%, M=10%, Y=10%, and K=30%. These colors are printed by an image forming unit 803. However, since the image forming unit 803 usually has some output position deviation, which is a mechanical instability element, respective data of CMYK are not always outputted to an identical position. In other words, an output result shown in FIG. 19 may be obtained. In this case, in a contour portion of a character outputted, color blurring occurs to deteriorate an image quality.

FIGS. 20 and 21 are diagrams for explaining color conversion processing by the path 2 in the case in which the character of the same 50% achromatic color is inputted. As shown in FIG. 20, since a color conversion result by the path 2 is only the black (K) color material, even if positional deviation occurs in the image forming unit 803, blurring of a contour part of the character does not occur as shown in FIG. 21. Thus, deterioration in an image quality does not occur.

In this way, it is possible to perform color conversion without deteriorating an image quality by using the path 2 when a color signal inputted is a substantially achromatic color. Since the path 2 is effective only when an input is a substantially achromatic color, as shown in FIG. 17, a judging unit 901 is provided to perform processing by a color converting unit 902 using the path 1 when the color signal inputted is a chromatic color and perform processing by an achromatic color gradation adjusting unit 903 using the path 2 when the color signal inputted is an achromatic color.

The conventional color adjustment processing in such a constitution is, as shown in FIG. 22, performed by correcting a color conversion table used in the path 1 using a color conversion table adjusting unit 904.

However, the conventional color adjustment processing described above has the following problems.

FIG. 23 is a diagram showing a result of printing an image without performing the color adjustment processing as described above. FIG. 24 is a diagram indicating which image area is subjected to the color conversion processing by the path 1 and the path 2 in the image of the print result shown in FIG. 23.

As shown in the figures, even when an image including a color signal processed by the path 1 and the path 2 is inputted, since the color conversion table and a TRC (Tone Reproduction Curve) are adjusted in advance, as shown in FIG. 23, it is possible to print an image without a sense of incongruity even in a boundary of the path 1 and the path 2.

In such a state, when a user feels that a color printed (see FIG. 23) undesirable and desires to make the printed image more bright, the color conversion table adjusting unit 904 in the constitution of FIG. 22 is used to correct the conversion table to increase brightness the printed result or to change the color to a favorite color.

However, in the conventional constitution shown in FIG. 22, since the color conversion table of the path 1 is only corrected, in an output result after correcting the color conversion table (after the color adjustment processing), a boundary of processing for an image area subjected to color conversion by the path 2 and an image area subjected to color conversion by the path 1 (a path to which the color adjustment processing is applied) may appear, resulting in an unnatural print result.

SUMMARY OF THE INVENTION

The invention has been devised to solve the problems described above and it is an object of the invention to provide a technique for preventing deterioration in an image quality of a printed image involved in adjustment of color conversion parameters in image formation processing.

In order to solve the problems, an image processing apparatus according to the invention is characterized by including: a change information acquiring unit that acquires, when first brightness setting information is changed, information on the change, the first brightness setting information defining, in printing colors that can be represented by color materials of plural colors, brightness that should be represented using the color materials; a calculating unit that calculates, on the basis of the change information acquired by the change information acquiring unit, information on second brightness setting information defining, in printing colors represented only by a black color material, brightness that should be represented using the color material, the second brightness setting information making it possible to print an image having substantially the same brightness as an image printed using the first brightness setting information changed; and a setting information changing unit that changes setting content of the second brightness setting information on the basis of the information calculated by the calculating unit.

An image processing method according to the invention is characterized by including the steps of: acquiring, when first brightness setting information is changed, information on the change, the first brightness setting information defining, in printing colors that can be represented by color materials of plural colors, brightness that should be represented using the color materials; calculating, on the basis of the change information acquired in the change information acquiring step, information on second brightness setting information defining, in printing colors represented only by a black color material, brightness that should be represented using the color material, the second brightness setting information making it possible to print an image having substantially the same brightness as an image printed using the first brightness setting information changed; and changing setting content of the second brightness setting information on the basis of the information calculated in the calculating step.

An image processing program according to the invention is characterized by causing a computer to execute: a change information acquiring step of acquiring, when first brightness setting information is changed, information on the change, the first brightness setting information defining, in printing colors that can be represented by color materials of plural colors, brightness that should be represented using the color materials; a calculating step of calculating, on the basis of the change information acquired in the change information acquiring step, information on second brightness setting information defining, in printing colors represented only by a black color material, brightness that should be represented using the color material, the second brightness setting information making it possible to print an image having substantially the same brightness as an image printed using the first brightness setting information changed; and a setting information changing step of changing setting content of the second brightness setting information on the basis of the information calculated in the calculating step.

DESCRIPTION OF THE DRAWINGS

FIG. 6 is a diagram for explaining a correction procedure for a color conversion table;

FIG. 7 is a diagram for explaining the correction procedure for the color conversion table;

FIG. 8 is a diagram for explaining the correction procedure for the color conversion table;

FIG. 9 is a diagram for explaining the correction procedure for the color conversion table;

FIG. 10 is a diagram for explaining brightness adjustment information;

FIG. 11 is a diagram showing a present TRC (before correction);

FIG. 12 is a diagram showing a result of calculating brightness of colors obtained when table values C", M", Y", and K" in FIG. 10 are actually printed by an output device;

FIG. 13 is a diagram showing a corrected TRC;

DESCRIPTION OF THE EMBODIMENTS

An embodiment of the invention will be hereinafter explained with reference to the drawings.

Figure 1:
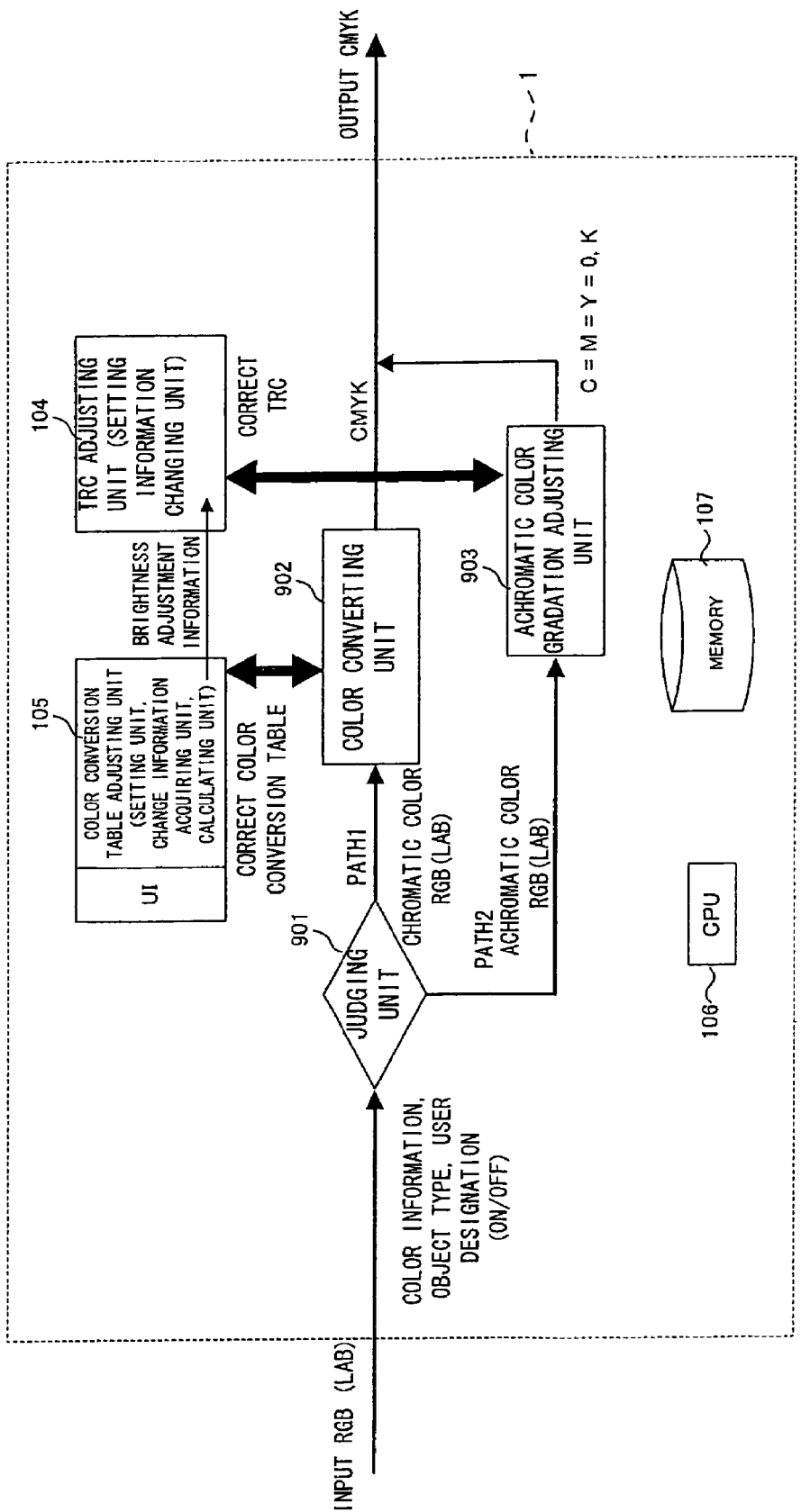
FIG. 1 is a functional block diagram for explaining an image processing apparatus according to an embodiment of the invention.

FIG. 1 is a functional block diagram for explaining an image processing apparatus according to this embodiment. An image processing apparatus 1 according to this embodiment is constituted by, for example, an MFP (Multi Function Peripheral) and includes a judging unit 901, a color converting unit 902, an achromatic color gradation adjusting unit 903, a TRC adjusting unit (corresponding to a setting information changing unit) 104, a color conversion table adjusting unit (corresponding to a setting unit, a change information acquiring unit, and a calculating unit) 105, a CPU 106, and a MEMORY 107.

Components identical with those described in the conventional constitution are denoted by the identical reference numerals and signals. Explanations of the components are omitted.

When a color conversion table defining, in printing colors represented by color materials of plural colors (cyan, magenta, yellow, and black), brightness that should be represented using the color materials is changed, the color conversion table adjusting unit 105 acquires information on the change. The color conversion table adjusting unit 105 includes a keyboard and a mouse for accepting an operation input of a user and includes a display for performing screen display of various kinds of information. It is assumed that the color conversion table adjusting unit 105 realizes, using a touch panel display, a function of accepting an operation input and a function of performing screen display.

The color conversion table adjusting unit 105 calculates, on the basis of the change information acquired, brightness adjustment information concerning a TRC defining, in printing a color that can be represented only by a black color material, brightness that should be represented using the color material. The brightness adjustment information makes it possible to print an image having substantially the same brightness as an image printed using the brightness setting information after the change.

The TRC adjusting unit 104 changes setting content of the color conversion table on the basis of the brightness adjustment information calculated by the color conversion table adjusting unit 105.

The color conversion table adjusting unit 105 has a function of setting, on the basis of an operation input of the user, necessity of processing for changing setting content of the brightness setting information by the TRC adjusting unit 104. When the color conversion table adjusting unit 105 sets the processing for changing setting content of the brightness setting information as unnecessary, the TRC adjusting unit 104 does not change the setting content of the brightness setting information.

The CPU 106 has a role of performing various kinds of processing in the image processing apparatus 1 and also has a role of realizing various functions by executing programs stored in the MEMORY 107. The MEMORY 107 is constituted by, for example, a ROM or a RAM and has a role of storing various kinds of information and programs used in the image processing apparatus 1.

Details of functions of the respective components in the image processing apparatus 1 according to this embodiment will be explained.

The judging unit 901 judges in which of the path 1 and the path 2 a color signal inputted is subjected to color conversion processing and sends the color signal to the path 1 or the path 2 according to a result of the judgment. For example, when the color signal inputted is represented by an RGB color space, the judging unit 901 judges whether the color signal is a chromatic color or an achromatic color. A judging method is represented by, for example, Expression (1).

$$abs(R-G) \leq Th1 \text{ \&\& } abs(G-B) \leq Th1 \text{ \&\& } abs(B-R) \leq Th1 \quad (1)$$

If RGB signal values inputted are substantially equal (a difference is within Th1), the judging unit 901 judges that the color signal is an achromatic color. Th1 is an appropriate threshold (e.g., 0 to 5). When the condition of Expression (1) is not satisfied, the judging unit 901 judges that the color signal is a chromatic color.

When a color signal inputted is represented by a CIELAB color space, an "L*" value of the color signal represents a brightness component and "a*" and "b*" represent color difference components. Thus, the judgment can be performed according to, for example, Expression (2).

$$abs(a^*) \leq Th2 \text{ \&\& } abs(b^*) \leq Th2 \quad (2)$$

If a* and b* of a CIELAB signal inputted is within a predetermined threshold Th2, the judging unit 901 judges that the color signal is an achromatic color. When the condition of Expression (2) is not satisfied, the judging unit 901 judges that the color signal is a chromatic color. The inputted color signal is sent to the path 1 or the path 2 on the basis of such judgment results.

The judging unit 901 may judge color conversion processing for a color signal inputted and divide the color signal on the basis of conditions other than the color signal. For example, there is a condition of object types indicating what kind of image a color signal inputted is. The types of objects include a photograph object, a character object, and a graphic object. For example, in the case of the character object and the graphic object, a color signal is divided according to the judgment described above. In the case of the photograph object, a color signal is forcibly divided to the path 1 without the judgment. There is also a function of determining whether the judgment is performed according to a condition designated by the user. In this case, the judgment is not performed and the path 1 is always used.

Figure 2:
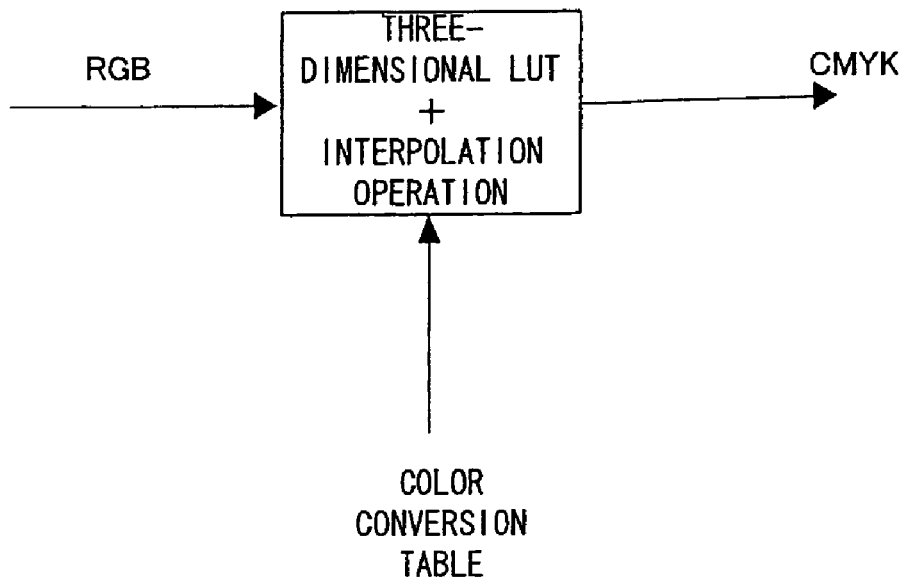
FIG. 2 is a diagram for explaining processing of a color converting unit 902.

The color converting unit 902 is color converting means provided for the path 1. Processing of the color converting unit 902 is shown in FIG. 2 as an example. In FIG. 2, a color space inputted is RGB (Red, Green, and Blue) and a color space outputted is CMYK. The color converting unit 902 has a three-dimensional LUT (Lookup Table). Data determining what kinds of RGB values inputted should be converted into what kinds of CMYK values in advance is stored in the three-dimensional LUT. This data is equivalent to a color conversion table (first brightness setting information) in the color converting unit 902 shown in FIG. 2. The respective values of RGB inputted are often values of about 256 kinds (8 bits). Combinations in this case are as many as about 16.7 million. It is unpractical to directly use the combinations as three-dimensional LUT data in terms of a memory capacity. Thus, usually, respective axes of the input RGB values are divided into several parts and CMYK values corresponding to combinations of RGB values at lattice points formed by the division are stored in the three-dimensional LUT as three-dimensional LUT data.

The data is stored in the three-dimensional LUT in this way. When combinations of the input RGB values are present in the three-dimensional LUT, CMYK values of the three-dimensional LUT data are outputted. When combinations of the input RGB values are not present in the three-dimensional LUT, plural lattice points (e.g., eight points) around the input RGB values are extracted and CMYK values of the three-dimensional LUT data corresponding to the plural lattice points extracted, respectively, are subjected to an interpolation operation to output CMYK.

When a color space inputted is CIELAB, the color conversion table (first brightness setting information) and the three-dimensional LUT data are set as data determining what kinds of CIELAB values inputted should be converted into what kinds of CMYK values.

Figure 3:
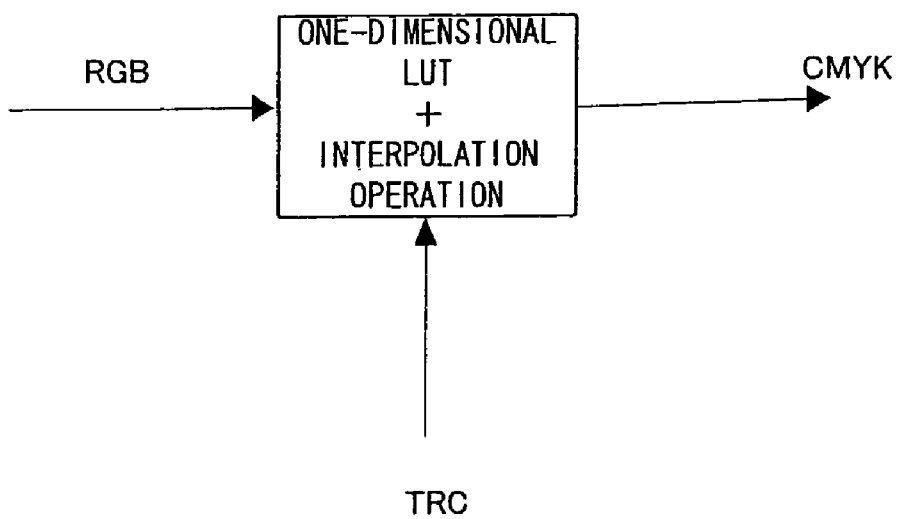
FIG. 3 is a diagram for explaining processing of an achromatic color gradation adjusting unit 903.

The achromatic color gradation adjusting unit 903 will be explained. The achromatic color gradation adjusting unit 903 is present in the path 2 and used when an input color signal is an achromatic color. As an example, processing of the achromatic color gradation adjusting unit 903 is shown in FIG. 3. In FIG. 3, a color space inputted is RGB and a color space outputted is CMYK. A color signal divided to the path 2 as described above is a color signal judged as an achromatic color by the judging unit. Thus, respective values of RGB inputted are substantially equal. The achromatic color gradation judging unit 903 has a one-dimensional LUT (Lookup Table). Data determining what kind of G value (or R value or B value) inputted should be converted into what kind of K value is stored in the one-dimensional LUT in advance. This data is equivalent to a TRC (second brightness setting information) in the achromatic color gradation judging unit 903 shown in FIG. 3.

The data is stored in the one-dimensional LUT in this way. If an input G value is present in the one-dimensional LUT, a K value of the one-dimensional LUT data is outputted. When an input G value is not present in the one-dimensional LUT, plural points (e.g., two points) around the input G value is extracted. K values of the one-dimensional LUT data corresponding to the plural lattice points extracted are subjected to interpolation operation to output K. CMY values outputted from the achromatic color gradation adjusting unit 903 are always 0 (a no print signal).

When a color space inputted is CIELAB, the TRC and the one-dimensional LUT data are set as data determining what kind of L value inputted should be converted into what kind of K value.

The color signal converted into CMYK values by the path 1 or the path 2 is printed by a not-shown image forming unit. CMYK values from which of the path 1 and the path 2 are used is determined according to in which path the signal is converted (if the path 1 is used, the CMYK values from the path 1 is used and, if the path 2 is used, the CMYK values from the path 2 is used).

The image forming unit is a printer of, for example, an ink jet system, an electrophotographic system, or a heat transfer system. In this embodiment, the printing system does not matter in particular.

Figure 4:
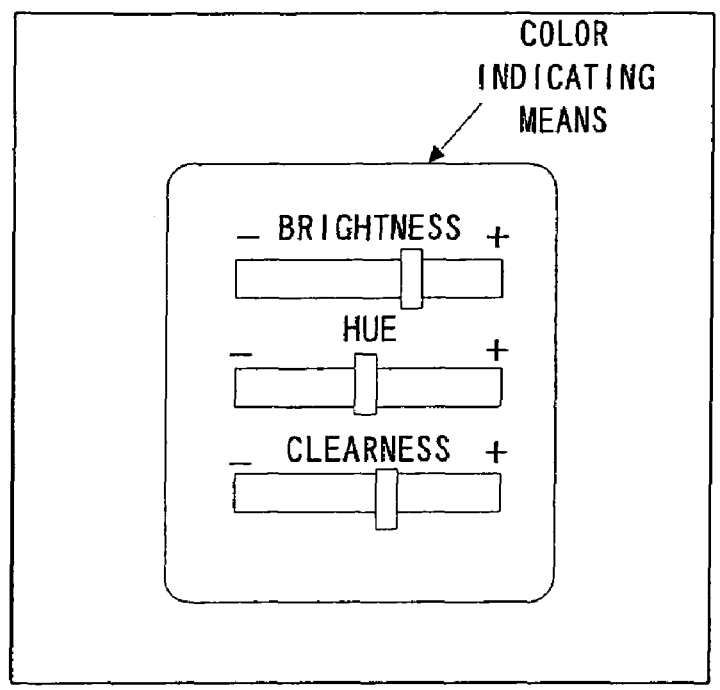
FIG. 4 is a diagram showing an example of color indicating means.

The color conversion table adjusting unit 105 corrects the color conversion table used in the color converting unit 902 according to designation of the user. The color conversion table adjusting unit 105 includes, for example, color indicating means shown in FIG. 4. The color indicating means has slide bars of, for example, "brightness", "hue", and "clearness" and adjusts the color conversion table according to user designation.

The TRC adjusting unit 104 corrects the TRC used in the achromatic color gradation adjusting unit 903. Specifically, the TRC adjusting unit 104 corrects the TRC in accordance with brightness adjustment information generated when the user adjusts the color conversion table with the color conversion table adjusting unit 105 (information calculated by the calculating unit).

Operations of the image processing apparatus according to this embodiment will be explained.

Figure 23:
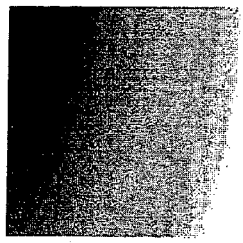
FIG. 23 is a diagram showing a result of printing an image without performing color adjustment processing.
Figure 24:
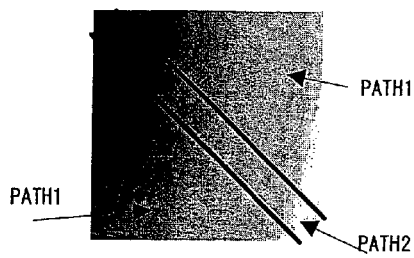
FIG. 24 is a diagram indicating which image area in the image of the print result shown in FIG. 23 is subjected to the color conversion processing by the path 1 and the path 2.

For example, when the user prints a pattern shown in FIG. 23, in FIG. 1, a color signal of each pixel of this pattern is inputted to the judging unit 901. The judging unit 901 judges whether each color signal of the pixel inputted is an achromatic color or a chromatic color according to the judging method. In the case of a chromatic color, the judging unit 901 sends the color signal of the pixel to the path 1. In the case of an achromatic color, the judging unit 901 sends the color signal of the pixel to the path 2. A color conversion result of the path 1 or the path 2 is sent to the not-shown image forming unit according to a division condition, respectively and FIG. 24 is printed. In FIG. 24, for explanation, a pixel area converted by the path 1 and a pixel area converted by the path 2 are shown. However, lines in the figure do not appear in an actual print result.

In this case, looking at FIG. 24, the user may feel that FIG. 24 is not a desired color. For example, the user may feel that FIG. 24 is dark as a whole or is not clear enough. In this case, the user can correct the color conversion table using the color conversion table adjusting unit 105 such that a print result of desired brightness and clearness is obtained. For example, when the user feels a print result dark and wishes to make the print result bright, the user slides the slide bar of "brightness" of the color indicating means in FIG. 4 in a direction for increasing brightness.

The color conversion table adjusting unit 105 corrects the color conversion table presently in use in accordance with an indication inputted by this color indicating means.

Figure 5:
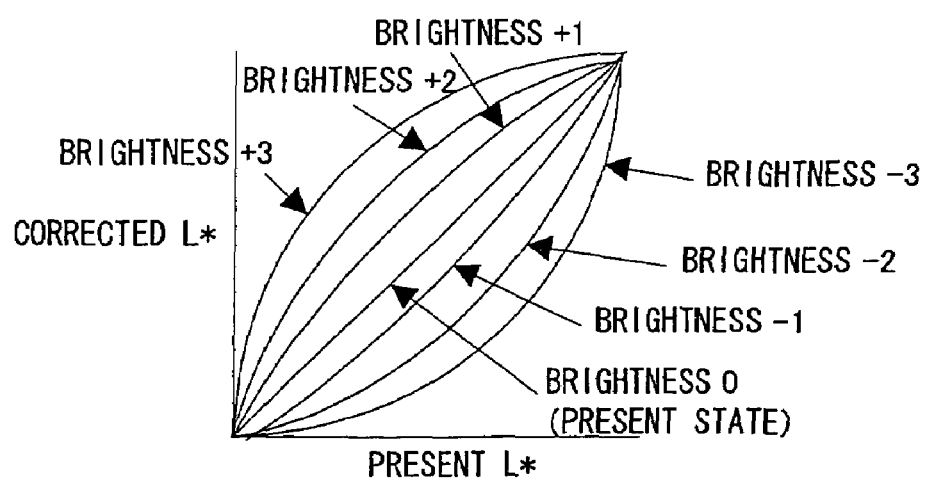
FIG. 5 is a graph defining a relation between present L* and corrected L*.

A specific example of the color conversion table is described below with an input address set as CIELAB and a table value set as CMYK. The color conversion table defines a relation between present L* and corrected L* shown in FIG. 5 in association with a value of the "brightness" slide bar of the color indicating means. For example, when the user indicates +2 in the direction for increasing brightness, a curve of brightness +2 in FIG. 5 is selected. It is determined to what kind of corrected L* this curve changes present L*.

A correction procedure for the color conversion table is shown in FIGS. 6 to 9. FIG. 6 shows a present color conversion table. The color conversion table has eleven lattice points on respective axes of L*, a*, and b* corresponding to units of input addresses. L*, a*, and b* of combinations of the lattice points are input addresses (1,331 in total).

First, as shown in FIG. 7, only L* values of respective L*, a*, and b* of all the input addresses are changed to corrected L' in accordance with the brightness +2 curve in FIG. 5. Subsequently, as shown in FIG. 8, C'M'Y'K' values corresponding to L', a*, and b* are calculated by the same arithmetic operation as that of the color converting unit 902. A color conversion table used in this case is the present color conversion table (FIG. 6).

As shown in FIG. 9, the CMYK values of the present color conversion table in FIG. 6 are replaced with the C'M'Y'K' values calculated in FIG. 8. According to the processing, the color conversion table indicated as brightness +2 by the user, that is, the corrected color conversion table is formed and used in the color converting unit 902 of the path 1 in FIG. 1. Thus, a chromatic color passing through the path 1 has "brightness +2".

The color conversion table adjusting unit 105 calculates brightness adjustment information using the color conversion table corrected. The brightness adjustment information is C"M"Y"K" values obtained by interpolation operation with the color conversion table corrected when the input L*, a*, and b* (a* and b* are 0) corresponding to an achromatic color is inputted as shown in FIG. 10. The achromatic color in this case is in a range of white (L=100) to black (L=0). In FIG. 10, L*, a*, and b* are described as input addresses. However, a* and b* are fixed values 0, a* and b* may be omitted.

The TRC adjusting unit 104 corrects a TRC used in the achromatic color gradation adjusting unit 903. The correction of the TRC is performed in accordance with brightness adjustment information generated when the user adjusts the color conversion table using the color conversion table adjusting unit 105. An example of the correction of the TRC is described below.

A present TRC (before correction) is shown in FIG. 11.

As in the color conversion table, an input address is set as L* and a table value is set as K. First, an L* value of achromatic color reproduction in the case in which the corrected color conversion table of the path 1 is used is calculated from the brightness adjustment information. Brightness of a color in the case in which the table values C"M"Y"K" in FIG. 10 are actually printed by the output device is calculated. Therefore, the TRC adjusting unit 104 holds color output characteristic data of the output device, that is, data indicating what kinds of colors (Lab) are outputted when an image is printed with what kinds of CMYK. A result of this calculation is shown in FIG. 12.

A K' value for printing an achromatic color of an L* value shown in FIG. 12 using only a color material K is calculated. It is possible to calculate this value from the color output characteristic data held by the TRC adjusting unit 104. A corrected TRC is formed by replacing the table value in FIG. 11 with this K' value and used in the achromatic color gradation adjusting unit 903 of the path 2 in FIG. 1. Thus, an achromatic color passing through the path 2 has "brightness +2" indicated by the user. The corrected TRC is shown in FIG. 13.

Figure 14:
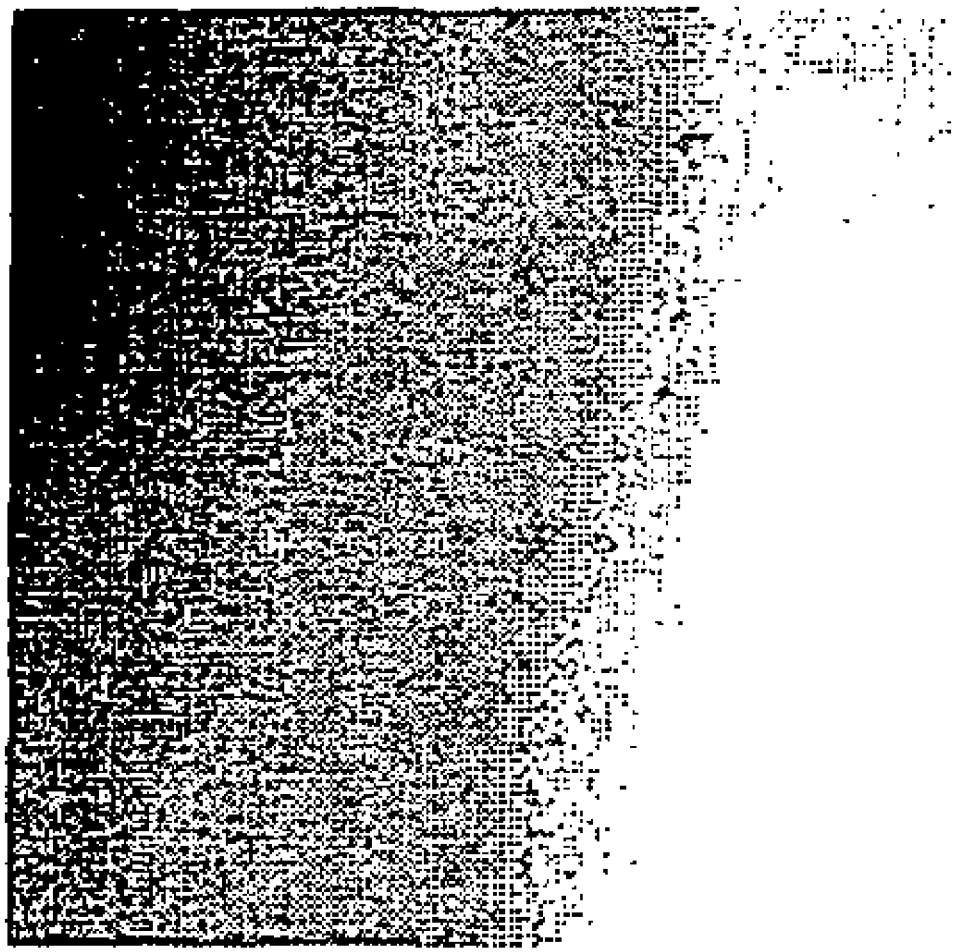
FIG. 14 is a diagram showing a satisfactory output image in which all processing areas of a path 1 and a path 2 have "brightness +2" desired by a user.
Figure 25:
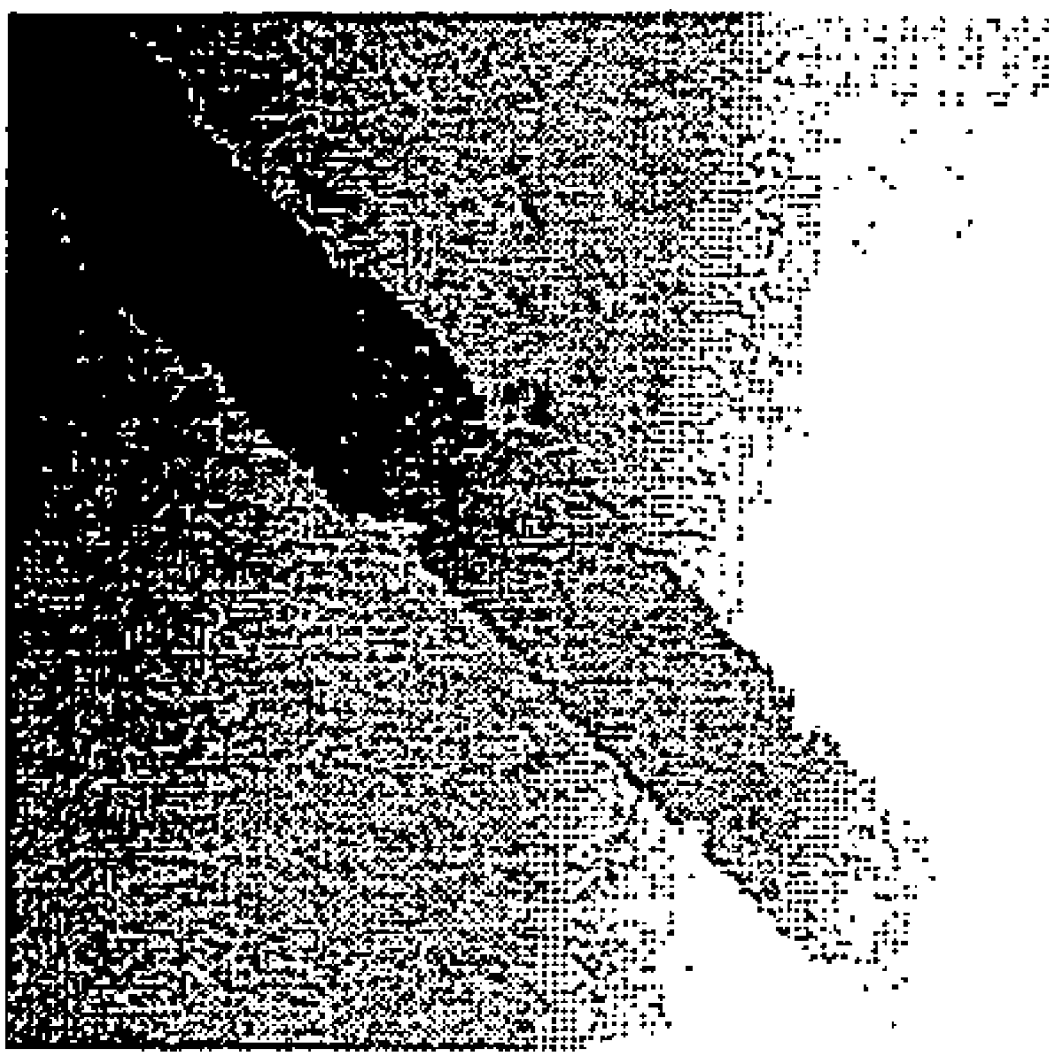
FIG. 25 is a diagram showing an example of an output result in which a boundary of processing for an image area subjected to color conversion by the path 2 and an image area subjected to color conversion by the path 1 appears.

Consequently, the color conversion table and the TRC are corrected according to the indication "brightness +2" by the user. Thus, the conventional problem in that a boundary of processing of the path 1 (a path to which the color adjustment processing is applied) and the path 2 appears as shown in FIG. 25 in an output result after the color conversion parameter correction (after the color adjustment processing), resulting in an unnatural output result, does not occur. As shown in FIG. 14, all the processing areas of the path 1 and the path 2 have "brightness +2" desired by the user.

Figure 15:
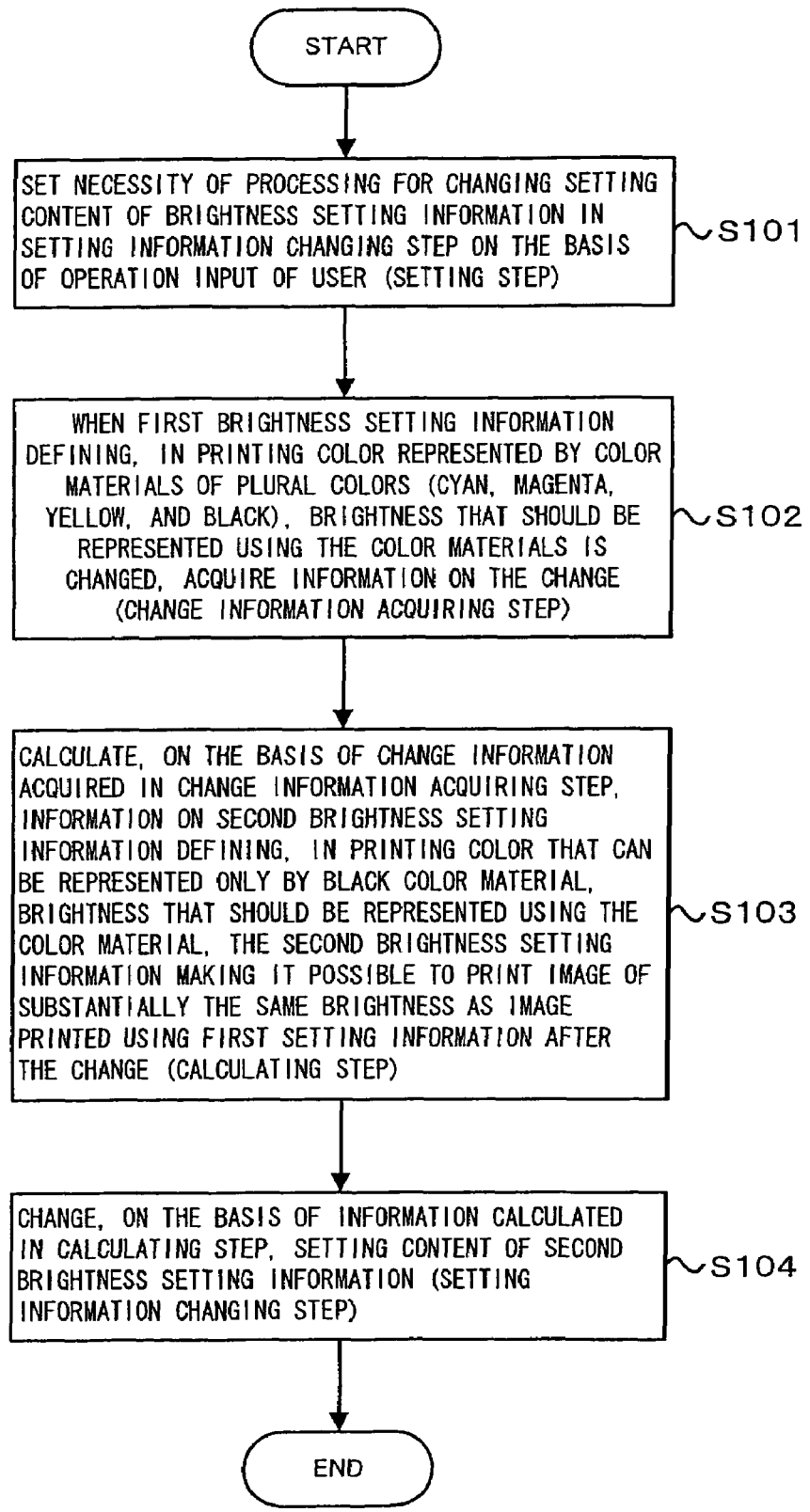
FIG. 15 is a flowchart for explaining a flow of processing in the image processing apparatus according to the embodiment.
Figure 16:
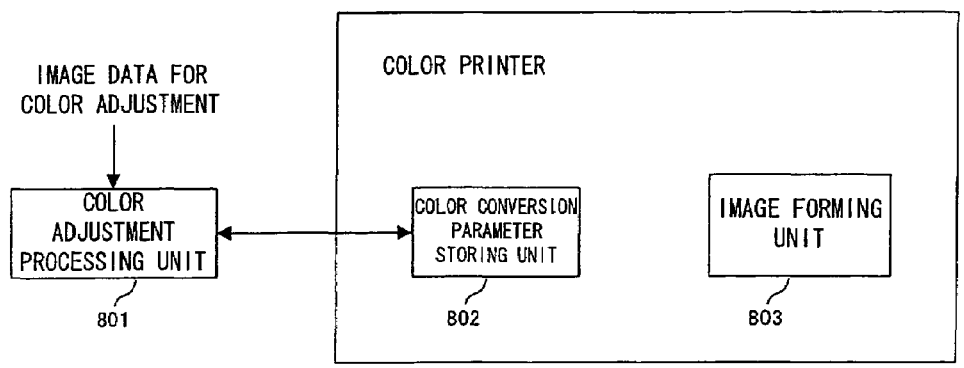
FIG. 16 is a diagram for explaining color adjustment processing.
Figure 17:
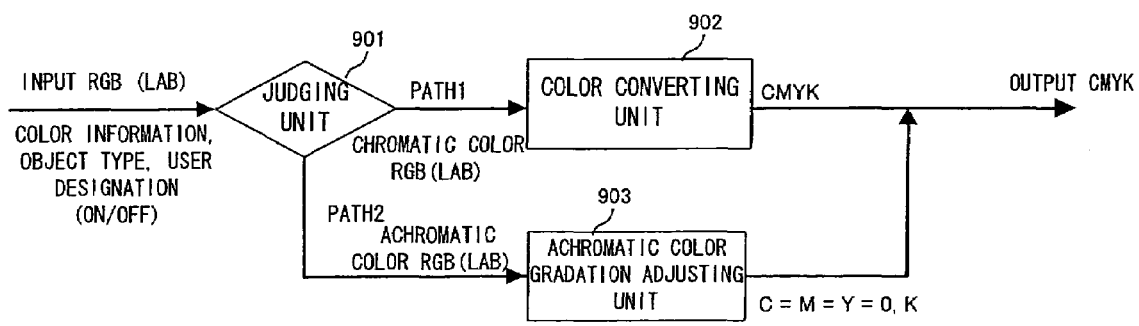
FIG. 17 is a diagram for explaining color conversion paths for performing color conversion processing for an input image using color conversion parameters.
Figure 18:
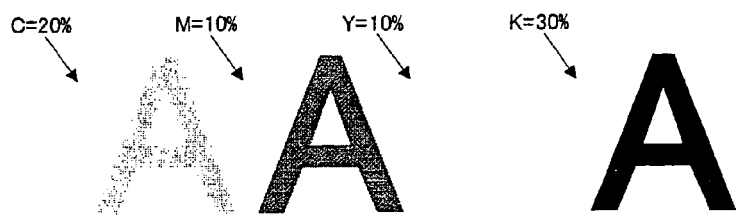
FIG. 18 is a color conversion result by the path 1 in the case in which a character of a 50% achromatic color (R=G=B=50%) is inputted.
Figure 19:
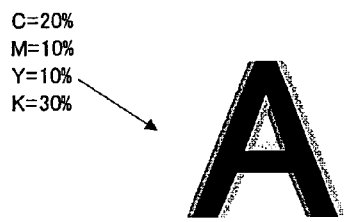
FIG. 19 is a diagram for explaining color drift.
Figure 20:
FIG. 20 is a diagram for explaining color conversion processing by the path 2 in the case in which a character of a 50% achromatic color is inputted.
Figure 21:
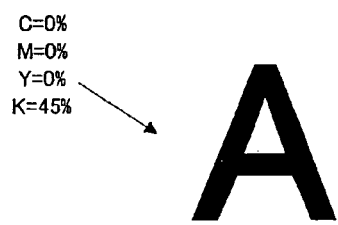
FIG. 21 is a diagram for explaining the color conversion processing by the path 2 in the case in which the character of the 50% achromatic color is inputted.
Figure 22:
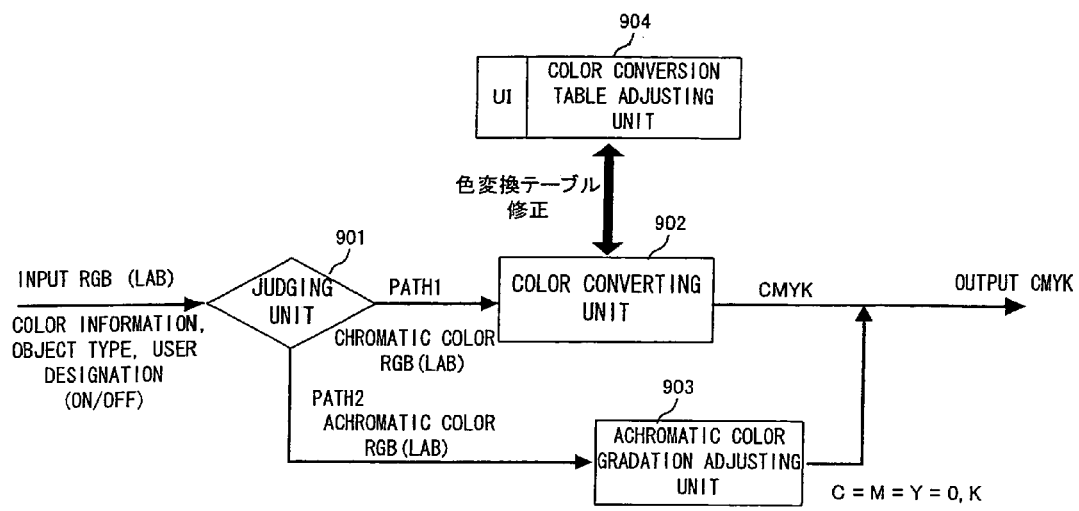
FIG. 22 is a diagram for explaining correction of a color conversion table used in the path 1 performed by using a color conversion table adjusting unit 904.

FIG. 15 is a flowchart for explaining a flow of processing in the image processing apparatus according to this embodiment.

The color conversion table adjusting unit 105 sets necessity of processing for changing setting content of brightness setting information in a setting information changing step (described later) on the basis of an operation input of the user (a setting step) (S101).

When the first brightness setting information defining, in printing a color represented by color materials of plural colors (cyan, magenta, yellow, and black), brightness that should be represented using the color materials is changed, the color conversion table adjusting unit 105 acquires information on the change (a change information acquiring step) (S102).

The color conversion table adjusting unit 105 calculates, on the basis of the change information acquired in the change information acquiring step, information on the second brightness setting information defining, in printing a color that can be represented only by a black color material, brightness that should be represented using the color material, the second brightness setting information making it possible to print an image of substantially the same brightness as an image printed using the first brightness setting information after the change (a calculating step) (S103).

The TRC adjusting unit 104 changes, on the basis of the information calculated in the calculating step, the setting content of the second brightness setting information (a setting information changing step) (S104). When the processing for changing the setting content of the brightness setting information is set as unnecessary in the setting step, in the setting information changing step, the change of the setting content of the brightness setting information is not performed.

The respective steps in the processing in the image processing apparatus are realized by causing the CPU 106 to execute an image processing program stored in the MEMORY 107.

In the explanation of this embodiment, the functions of carrying out the invention are recorded in the apparatus in advance. However, the invention is not limited to this. The same functions may be downloaded from a network to the apparatus or the same functions stored in a recording medium may be installed in the apparatus. A form of the recording medium may be any form as long as the recording medium is a recording medium that can store programs and is readable by the apparatus such as a CD-ROM. The functions obtained by installation or download in advance in this way may be realized in cooperation with an OS (operating system) or the like in the apparatus.

According to this embodiment, the TRC table of color areas reproduced only by the color material K is automatically corrected simultaneously with the color conversion table in accordance with an instruction of the user. Thus, There is an effect that the user can perform color adjustment of a printer easily and as intended.

The invention has been explained in detail according to the specific embodiment. However, it would be apparent to those skilled in the art that various alterations and modifications can be made without departing from the spirit and the scope of the invention.

As described above in detail, according to the invention, it is possible to provide a technique for preventing image quality deterioration of a print image involved in adjustment of the color conversion parameters in the image formation processing.

What is claimed is:

1. An image processing apparatus comprising:
    a judging unit configured to determine whether a first color signal being input represents a chromatic color or an achromatic color;
    a first color converting unit configured to convert the input first color signal so as to output a second color signal according to first brightness setting information when the judging unit determines that the input first color signal is a chromatic color;
    a second color converting unit configured to convert the input first color signal so as to output a second color signal according to second brightness setting information when the judging unit determines that the input first color signal is an achromatic color;
    a first color adjusting unit configured to adjust the first brightness setting information; and
    a second color adjusting unit configured to adjust the second brightness setting information according to a brightness change made to the first brightness setting information adjusted by the first color adjusting unit.

2. An image processing apparatus according to claim 1, wherein the second brightness setting information is information on a gradation representation curve.

3. An image processing apparatus according to claim 1, further comprising a setting unit configured to set, on the basis of an operation input of a user, necessity of processing for changing the setting content of the second brightness setting information by the second color adjusting unit, wherein
the second color adjusting unit does not change the setting content of the second brightness setting information when the processing for changing the setting content of the second brightness setting information is set as unnecessary by the setting unit.

4. An image processing apparatus according to claim 1, wherein the color materials of plural colors are color materials of cyan, magenta, yellow, and black.

5. An image processing method comprising the steps of:
determining whether a first color signal being input represents a chromatic color or an achromatic color;
converting the input first color signal so as to output a second color signal according to first brightness setting information when it is determined that the input first color signal is a chromatic color;
converting the input first color signal so as to output a second color signal according to second brightness setting information when it is determined that the input first color signal is an achromatic color;
adjusting the first brightness setting information; and
adjusting the second brightness setting information according to a brightness change made to the first brightness setting information.

6. An image processing method according to claim 5, wherein the second brightness setting information is information on a gradation representation curve.

7. An image processing method according to claim 5, further comprising setting, on the basis of an operation input of a user, necessity of processing for changing the setting content of the second brightness setting information in the second brightness setting information adjusting step, wherein
in the second brightness setting information adjusting step, the setting content of the second brightness setting information is not changed when the processing for changing the setting content of the second brightness setting information is set as unnecessary in the setting step.

8. An image processing method according to claim 5, wherein the color materials of plural colors are color materials of cyan, magenta, yellow, and black.

9. An image processing program stored in a computer readable medium causing a computer to execute:
a judging step of determining whether a first color signal being input represents a chromatic color or an achromatic color;
a first color converting step of converting the input first color signal so as to output a second color signal according to first brightness setting information when it is determined in the judging step that the input first color signal is a chromatic color;
a second color converting step of converting the input first color signal so as to output a second color signal according to second brightness setting information when it is determined in the judging step that the input first color signal is an achromatic color;
a first color adjusting step of adjusting the first brightness setting information; and
a second color adjusting step of adjusting the second brightness setting information according to a brightness change made to the first brightness setting information adjusted by the first color adjusting step.

10. An image processing program according to claim 9, wherein the second brightness setting information is information on a gradation representation curve.

11. An image processing program according to claim 9, further comprising a setting step of setting, on the basis of an operation input of a user, necessity of processing for changing the setting content of the second brightness setting information in the second color adjusting step, wherein
in the second color adjusting step, the setting content of the second brightness setting information is not changed when the processing for changing the setting content of the second brightness setting information is set as unnecessary in the setting step.

12. An image processing program according to claim 9, wherein the color materials of plural colors are color materials of cyan, magenta, yellow, and black.

13. An image processing apparatus according to claim 1, wherein the first color signal represents color data in an RGB color space.

14. An image processing apparatus according to claim 1, wherein the second color signal represents a CMYK color.

* * * * *